United States Patent

Marotte

[15] 3,701,864

[45] Oct. 31, 1972

[54] AUTOMATIC MEASURING SYSTEM FOR A GROUP OF TELECOMMUNICATION CIRCUITS

[72] Inventor: Pierre L. Marotte, Conflans-Sainte-Honorine, France

[73] Assignee: Lignes Telegraphiques et Telephoniques, Paris, France

[22] Filed: May 3, 1971

[21] Appl. No.: 139,387

[30] Foreign Application Priority Data

May 28, 1970 France......................7019491

[52] U.S. Cl. ..........................................179/175.2 R

[51] Int. Cl. ..........................H04m 1/24, H04m 3/00

[58] Field of Search .....................179/175.2 R, 175.3

[56] References Cited

UNITED STATES PATENTS 2,819,354 1/1958 Shoffstall................179/175.3

*Primary Examiner*—Kathleen H. Claffy
*Assistant Examiner*—Douglas W. Olms
*Attorney*—Abraham A. Saffitz

[57] ABSTRACT

Automatic apparatus for sequentially measuring the transmission characteristics of a number of telecommunication circuits without interrupting the normal operation of the said circuits. The apparatus comprises a master system located at a first station and an auxiliary system located at a second station; each of the systems comprises a telecommunication circuit switching selector, a signal level measuring set switching selector and programmed control means for the said selectors, to automatically provide a number N of consecutive measurement cycles each comprising a number M of different measurements bothways between the two stations. The apparatus also uses a service channel, a remote control channel and a bypass circuit; the latter is used for traffic as a momentary replacement for whichever telecommunication circuit is undergoing the measurement cycle. The apparatus is particularly adapted to frequency division multiplex carrier-current telecommunication systems.

5 Claims, 3 Drawing Figures

Figure 1:
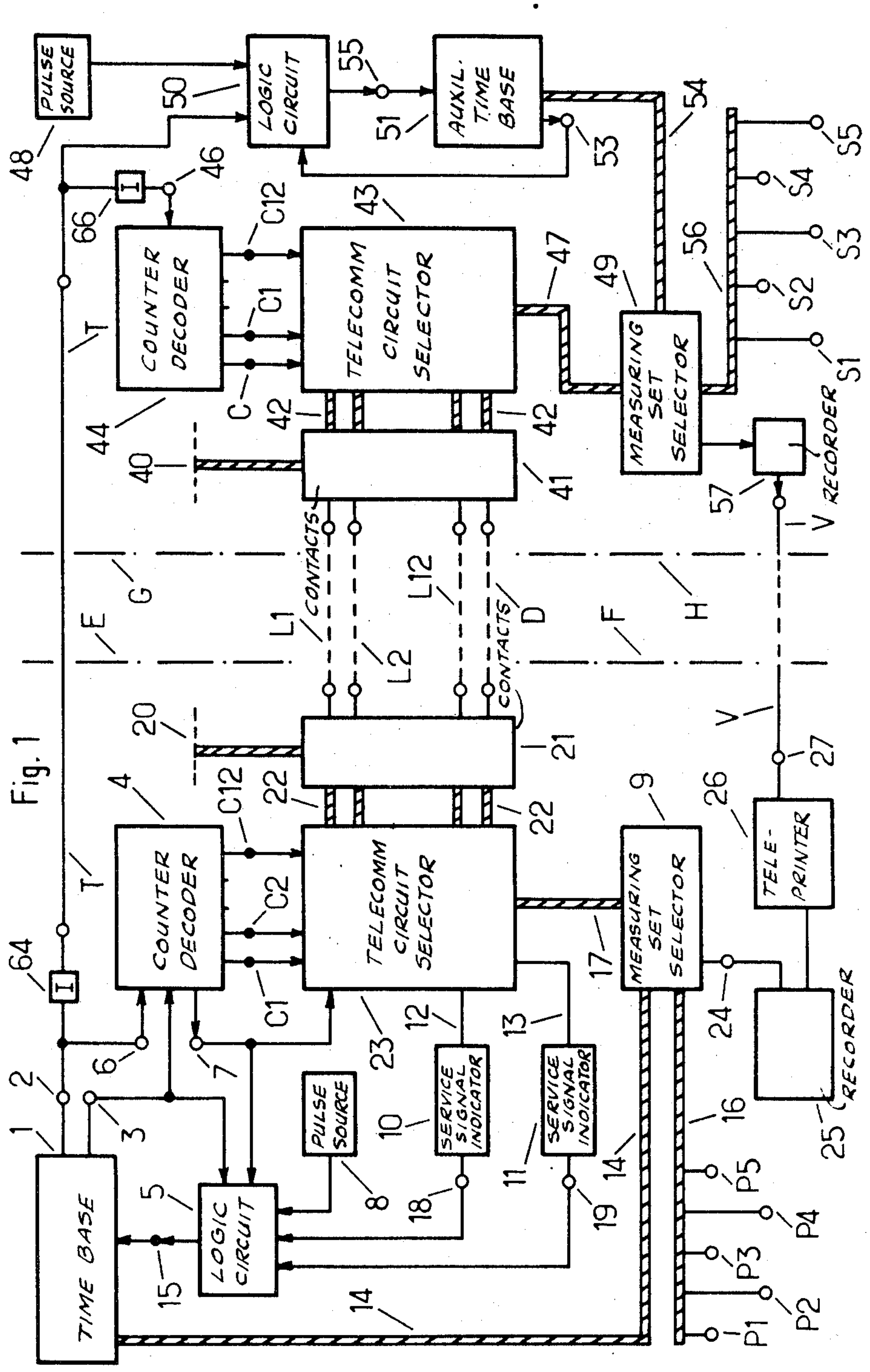

INVENTOR:
Pierre L. MAROTTE
By: Abraham A. Saffitz
ATTORNEY

INVENTOR:
Pierre L. MAROTTE
By: Abraham A. Saffitz
ATTORNEY

INVENTOR:
Pierre L. MAROTTE
By: Abraham A. Saffitz
ATTORNEY

AUTOMATIC MEASURING SYSTEM FOR A GROUP OF TELECOMMUNICATION CIRCUITS

This invention relates to an automatic programmed system for measuring a number M of transmission characteristics of each one of a number N of telecommunication circuits between two stations — a main station P and a secondary station S — the N circuits belonging to N telephone circuits respectively, measurements being made seriatim on each circuit both ways without interruption of circuit operation.

The terms "telecommunication circuits" and "telephone circuit" are used with the meanings given by the vocabulary of the International Telegraphy and Telephony Consultative Committee (CCITT); a telecommunication circuit is "a means of bothway communication between two points, comprising associated "go" and "return " channels;" a "channel" is "a means of oneway transmission", and a "telephone circuit" is "a permanent electrical connection permitting the establishment of a telephone communication in both directions between two telephone exchanges."

Because of the continuous and rapid growth of traffic, very rapid and fairly frequent measurements either of the telephone circuits themselves or of the telecommunication circuits which they use are required for telephone circuit maintenance purposes, but they should be effected without disturbing traffic. Automatic equipment helps in this respect and a number of automatic systems are known, such as the one described in the article by P. Carlström, entitled "Automatic transmission measuring set for telephone circuits" in the Journal "Ericsson Review," 1963, Vol. 2, pages 62 to 68.

In contrast to the prior art, this invention provides a system, one of whose advantages is that it can be used for automatic measurement of transmission characteristics of a number of telecommunication circuits consecutively without interrupting traffic on the telephone circuits using such telecommunication circuits.

According to the invention, the system comprises a master device in one station P and an auxiliary device in a station S, both such stations being connected to the N telecommunication circuits to be measured and to one other telecommunication circuit, hereinafter called a bypass circuit D, and to two transmission channels, one called a service channel V (used in the direction from S to P) and the other called the remote control channel T (used in the direction from P to S), the master device and the auxiliary device both comprising the following elements:

Measuring sets operating individually either for P-to-S measurements of for S-to-P measurements (in different states called "transmission measurement" and "reception measurement");

A measuring-set switching selector and automatic control means therefor enabling a measurement cycle consisting of the sequence of M measurements in the P-to-S direction and of the similar M measurements in the S-to-P direction to be carried out on a single telecommunication circuit, and A telecommunication-circuit switching selector and automatic control means therefor for consecutively substituting the bypass circuit for each of the N telecommunication circuits for the duration of a measurement cycle and for bringing the corresponding telecommunication circuit into a "measurement" state in which the last mentioned circuit is connected seriatim to the various measurement facilities during the cycle.

According to another feature, the master device also has means for supervising circuit occupation, such means being adapted to detect the transmission of a service signal item on one hand along whichever telecommunication circuit is to be put in the condition for measurement at the next selection on another hand over the bypass circuit.

According to another feature of the invention, the telecommunication-circuit selector operates before the start of a measurement cycle only if the circuit occupation supervision means detect no service signal item transmission over either of the supervised circuits.

According to another feature of the invention, the measurement facilities have means for outputting the measurement results in code, and the master device has a facility for recording the measurement results output at station P (for measurements from S to P) and the measurement results output in station S (for measurements from P to S), the last-mentioned results being transmitted over the service channel.

According to another feature, the remote control channel is used to transmit signals controlling the programmed operation from the master device to the auxiliary device.

Figure 2:
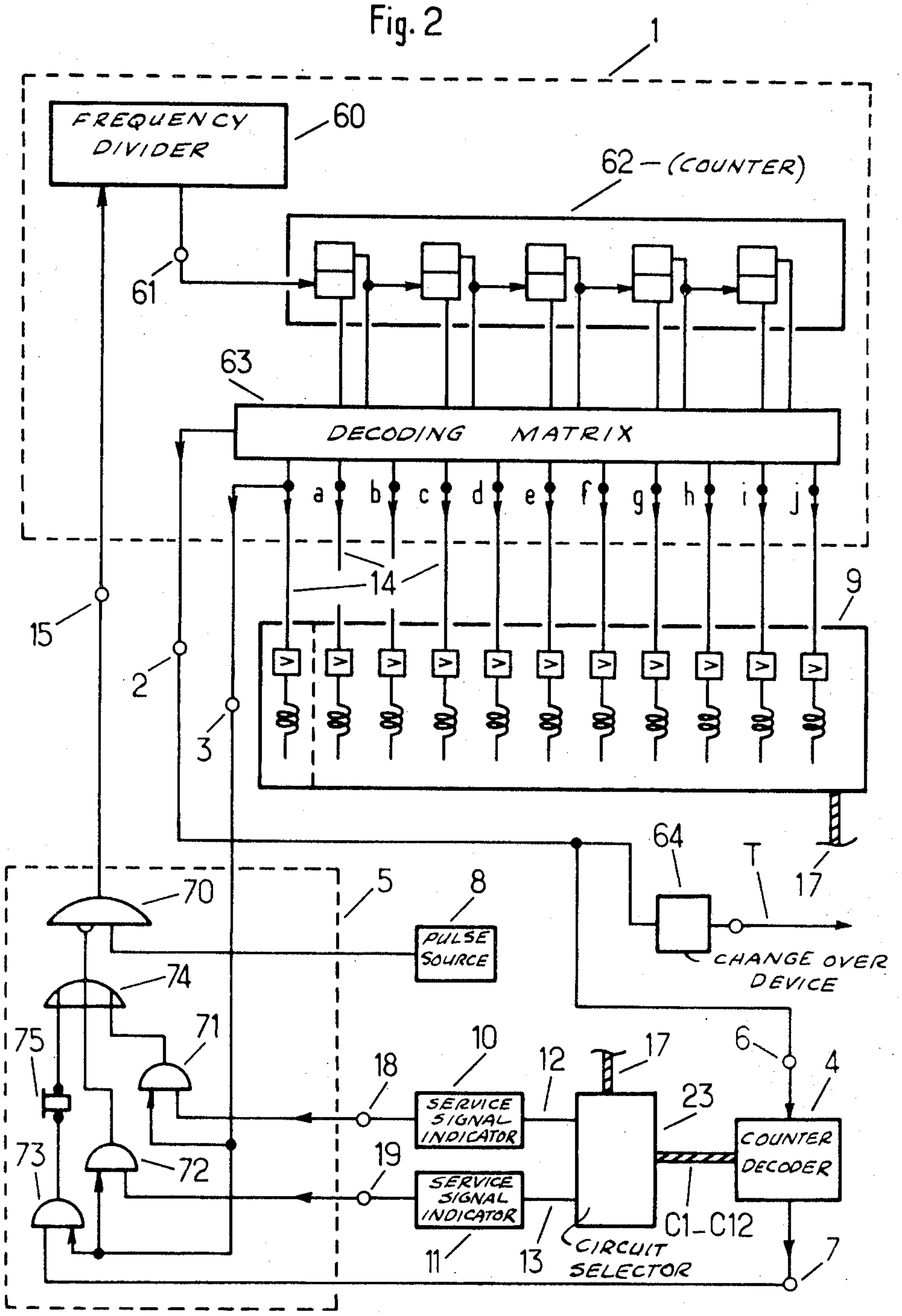
Figure 3:
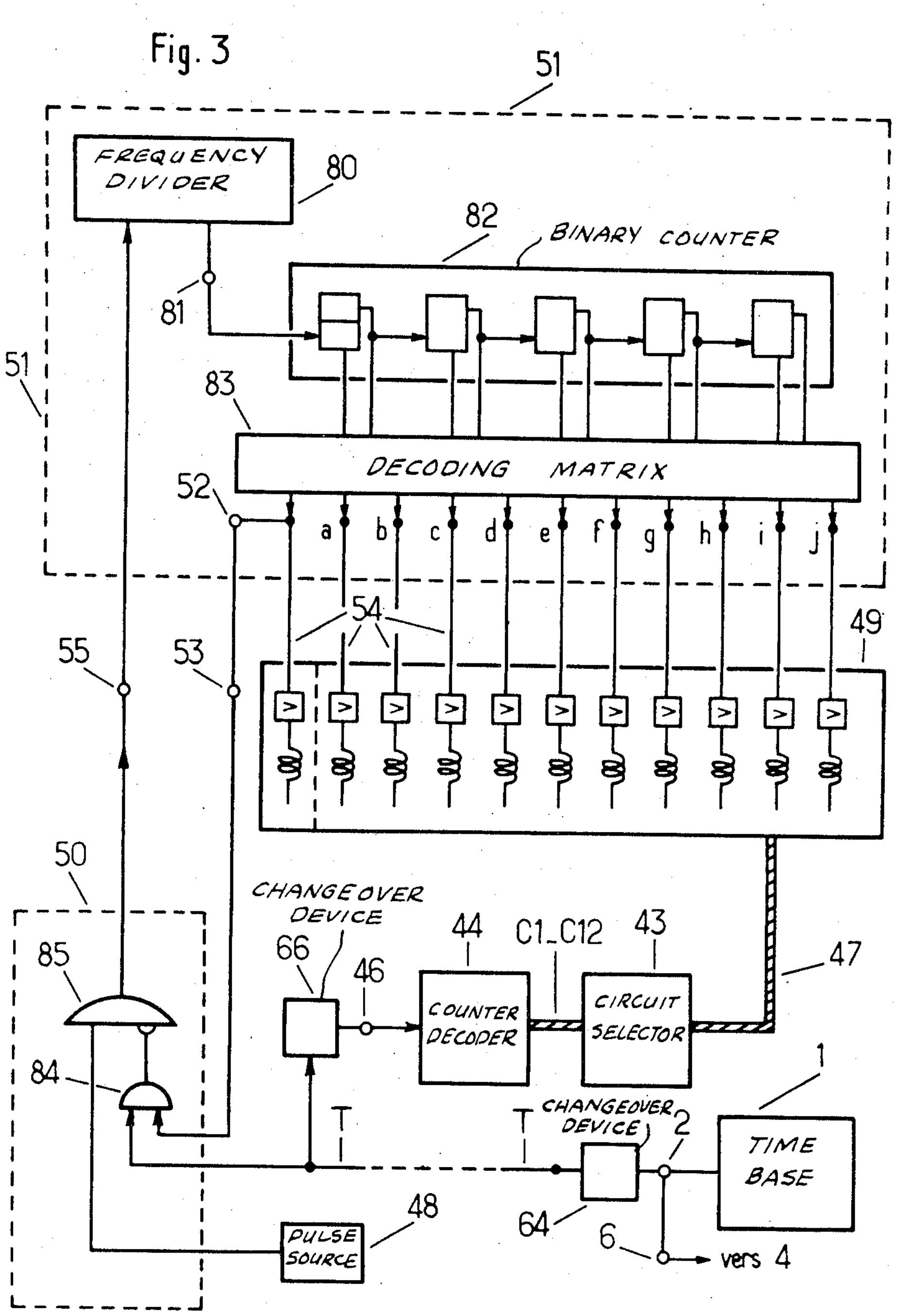

Other features and advantages of the invention will be disclosed by the following description of an embodiment with reference to the accompanying drawings, the description and drawings not limiting the scope of the invention. In the drawings:

FIG. 1 is a block schematic diagram of the complete system according to the invention, showing the master device and the auxiliary device, and FIGS. 2 and 3 are mode detailed views of the master device and auxiliary device respectively.

The system described is adapted to make five transmission measurements on each of the 12 telecommunication circuits of a basic group of a frequency division carrier current system, each measurement being made first from P to S and then from S to P — i.e., 10 measurements in all are made, for instance, as follows:

Measurements 1 to 3: transmission equivalents at three different frequencies from P to S, total time 6 seconds;

Measurement 4: line noise from P to S, lasting 5 seconds, and

Measurement 5: signal distortion from P to S, lasting about 2 seconds.

Measurements 6 to 10 are an identical series but from S to P; the total measurement cycle time is 26 seconds. The measurements represented by the N consecutive cycles over the N telecommunication circuits will hereinafter be called "measurement sequence."

FIG. 1 is a block schematic view of the system according to the invention, the main or master device being shown to the left of the vertical chain-dotted line EF and the auxiliary device being shown to the right of the vertical chain-dotted line GH. Both devices are connected to twelve telecommunication circuits V1 to V12, to bypass channel D, to service channel V and to remote control channel T via two selectors 64, 66. The circuits V1 to V12 are used for traffic and form part of 12 telephone circuits connected to exchanges on either side of each of the stations P and S by conductors shown as groups 20 and 40; the corresponding connections are made by contact elements 21, 41, for instance, in the form of plugs having separate multiple contacts.

The two contact elements 21 and 41 are connected by conductors shown as groups 22 and 42 to two selectors 23, 43 hereinafter called circuit selectors; the same have twelve working states (from 1 to 12) and an inoperative state hereinafter called "neutral." The circuit selectors 23, 43 serve to bring the channel D and the circuits V1 to V12 into the states given in Table I hereinafter.

TABLE I

States of Selectors 23 and 43

| State of circuits | Neutral | One | Two | Eleven | Twelve |
|---|---|---|---|---|---|
| Measurement | — | V1 | V2 | V11 | V12 |
| Supervision | V1 | V2 | V3 | V12 | — |
| Bypass-operation | D(—) | D(V1) | D(V2) | D(V11) | D(V12) |

The "measurement" and "supervision" states of the channels have been defined in the foregoing; the "-bypass-operation" state indicates that circuit D is being used instead of the circuit being measured, circuit D being available when the selectors 23 and 43 are in the neutral state; contacts which can be called the "measurement," "supervision" and "bypass-operation" contacts are in known manner provided in each of the selectors 23, 43.

The changeovers of the selectors 23 and 43 occur virtually simultaneously at the master and auxiliary stations and are brief enough not to impair speech over the circuits concerned; however, switching of this kind would disturb signal-service signals and so, as will be described hereinafter, selection operations are always delayed until no signal-service signal is passing over the circuits concerned.

In addition to the integers 20–23 already mentioned, the master station has a time base 1 with an input 15, control outputs 2, 3 and other control outputs connected to conductors forming a group 14, a counter and decoder 4 having a stepping-on input 6, an output 7 and other outputs C1 to C12 connected to corresponding inputs of the selector 23, a logic circuit 5 having five inputs and an output connected to input 15, a 50 Hz pulse source 8 and a measuring set selector 9. The same has ten working states from 1 to 10 and an inoperative or neutral state, the contacts being connected to measuring sets P1, P2, P3, P4, P5 by conductors of the group 16 in the proportion of two circuits per set for the two measurements states; the sets are operated consecutively first in the "transmission measurement" state (from P to S) and then in the "reception measurement" state (from S to P); for instance, in measuring a transmission equivalent at a given frequency, the "transmission measurement" state corresponds to the operation of an oscillator and the "measurement" state corresponds to a level measurement with a nepermeter (signal level meter).

The connections between the telecommunication circuit being measured and the measuring sets are made consecutively via conductors which interconnect internal contacts of selectors 23 and 9 and which are represented by group 17. Also, the conductors of group 14 which are connected to the control outputs of time base 1 are connected to corresponding inputs of the measuring set selector 9.

The master station also comprises two facilities 10, 11 for indicating the service signal state of a telecommunication circuit; such facilities are conventional in telecommunications and take the form in the example described of a detector circuit connected by a conductor 12 or 13 to a coupling circuit coupled with a particular telecommunication circuit inside the selector 23; the facility 10 or 11 delivers a signal at its output 18 or 19 if a signal-service signal is passing, and one of the facilities, for instance the facility 10, checks the service signal state of the telecommunication circuit under supervision and the other facility checks the service signal state of circuit D which, except when selector 23 is in its neutral position, is brought into the operative state to replace one of the circuits V1 to V12.

The measurement results are delivered as numerical signals at an appropriate number of outputs of selector 9 (all of whose outputs are denoted by the reference 24) connected to the inputs of a conventional recorder 25; the same can also receive measurement results from the auxiliary station through the agency of appropriate means, such as a teleprinter 26 having a signal input 27 connected to the service channel V.

The auxiliary station on the right of the chain-dotted line GH comprises the conductor group 40, the element 41 with the contacts (multicontact plugs), the conductor group 42 and the telecommunication circuit selector 43, all of which items have already been mentioned and are similar to the items 20, 21, 22, 23 respectively. The auxiliary station also comprises a counter and decoder 44 which is similar to the integer 4 and which has 13 outputs C, C1 to C12, an auxiliary time base 51 similar to the time base 1, a pulse source 48 similar to the integer 8, a set selector 49 like the selector 9, and a logic circuit 50 to be described hereinafter. The integer 44 has a stepping-on input 46 which is connected to the remote control line T via selector 66, line T also being connected to an input of logic circuit 50; the output thereof is connected to input 55 of time base 51 and an output terminal 53 of time base 51 is connected to an input of logic circuit 50; conductors of a group 47 connect the measurement contacts of selector 43 to the contacts of the set selector 49 and other conductors which form a group 54 connect control outputs of time base 51 to corresponding inputs of set selector 49 in a manner to be described in greater detail hereinafter. Conductors shown as a group 56 connect the measurement contacts of selector 49 to the measurement sets S1, S2, S3, S4, S5 similar to the sets P1, P2, P3, P4, P5, the references indicating inversion of the previous state ("transmission measurement" for "reception measurement" and vice versa).

The indications of the auxiliary station measurement sets are output by a group 49 of output terminals and can be recorded at station S and/or transmitted to station P over channel V via conventional devices 57.

FIG. 2 shows the master station with the connections of time base 1, the source 8 and the logic circuit 5 and, in diagrammatic form, how the set selector 9 is devised and how it is connected to the time base 1. The time base times the operations programme to occur at time intervals corresponding to the times of the ten measurements previously mentioned for a total length of at least 32 seconds (of which 26 seconds are taken up by measurements), in a manner to be described hereinafter. The time base 1 is conventional; it receives 50 Hz pulses from the source 8 (when the negator circuit 70 of logic circuit 5 is conductive) and comprises a 50-fold frequency divider circuit 60 which outputs at its output 61 pulses at the rate of 1 per second, the pulses going to the input of a five-stage (for 32 states) binary counter, the time base 1 also comprising a decoding matrix 63 having 12 different outputs (2 and 3 and from *a* to *j*); a signal is delivered at each of the latter outputs in accordance with the 32-second programme, the 32 seconds being split up between the 10 measurements mentioned as shown in Table II.

TABLE II

| States of Counter **62** | Time (sec) | Operation or Measurement | No.s of States of Selector 9 | Output of Matrix 63 |
|---|---|---|---|---|
| 1 or 2 | 2 | Measure No. 1 | 1 | a |
| 3 or 4 | 2 | Measure No. 2 | 2 | b |
| 5 or 6 | 2 | Measure No. 3 | 3 | c |
| 7 or 8 or 9 or 10 or 11 | 5 | Measure No. 4 | 4 | d |
| 12 or 13 | 2 | Measure No. 5 | 5 | e |
| 14 or 15 | 2 | Measure No. 6 | 6 | f |
| 16 or 17 | 2 | Measure No. 7 | 7 | g |
| 18 or 19 | 2 | Measure No. 8 | 8 | h |
| 20 or 21 or 22 or 23 or 24 | 5 | Measure No. 9 | 9 | i |
| 25 or 26 | 2 | Measure No. 10 | 10 | j |
| 27 or 28 or 29 or 30 or 31 or zero | at least 6 | Wait | Neutral | 3 |
| Zero | at most 1 | Change of cycle | Neutral | 2 |

The right-hand end column of Table II denotes the matrix output where a control signal (2, 3 and from *a* to *j*) corresponding to the states of the counter 62 (left-hand (first) column) and the states of the measuring set selector 9 is delivered.

Selector 9 is conventional and comprises 11 relays adapted to provide the 11 different states; the relays are shown diagrammatically by their control windings which are connected individually (via current amplifiers for providing effective power) to the various outputs of the matrix 63 (3 and *a*,... *j*); terminal 2 is connected to the stepping-on input 6 of the counter-decoder 4 and to channel T via the selector 64.

Details of the counter and decoder 4 and of the line selector 23 are not shown; in this example, the device 4 comprises a four-stage binary counter and a 13-output (7 and C1 to C12, FIGS. 1 and 2) decoding matrix for decoding the first 13 states of the counter from zero (the states 12–15 being in a logic connection); selector 23 has 13 relays whose control windings are connected individually to the outputs of the 13-output decoding matrix.

Stepping-on of the device 4 is controlled from the time-base output 2 (via input 6); as will be seen subsequently, a signal appears at output 2 at the start of a measurement sequence and at the end of each measurement cycle (zero state of counter 62); when the counter of the device 4 is in its zero state, a signal appears at output 7.

When in the "1" state the remote control channel T is energized with one polarity, and is changed over to the "zero" state by the selector or changeover device 64 upon the appearance of a signal at output 2; as will be seen subsequently, the latter signal, which is the end-of-cycle signal, serves for remote control of the auxiliary station from the main station.

FIG. 2 shows details of the logic circuit 5 which comprises the negator circuit 70 previously mentioned, three and-gates 70–73 and an or-gate 74 with the inputs and outputs connected as shown, the output of or-gate 74 being taken to the inverting input of the negator 70; the connection between the output of and-gate 73 and the input of or-gate 74 can be made or broken as required by means of a manual control switch 75.

FIG. 3 shows the auxiliary station. Time base 51 and measuring set selector 49 are similar to the like-named integers 1 and 9 of FIG. 2; a 50-fold frequency divider 80 outputs 1 Hz frequency pulses at output 81 for an input of 50 Hz pulses to input 55 from source 48 through negator 85; a five-stage binary counter 82 has its outputs connected to a decoding matrix 83 serving to decode the states of the counter 82 in just the same way as the matrix 63 decodes the states of the counter 62 (FIG. 2 and Table II); the decoding matrix 83 has outputs *a* to *j* and 52, the latter being connected to terminal 53 corresponding to terminal 3 of FIG. 2 for the 27 to 31 and zero states of counter 82.

Logic circuit 50 has an and-gate 84, with one input connected to terminal 53 and the other to line T, and a negator 85 with the non-inverting input connected to the 50 Hz pulse source 48 and the inverting input connected to the output of and-gate 44 and with the output connected to the input 55 of time base 51. The function of the negator 66 is to bring the terminal 46 (stepping-on input of counter and decoder 44) into the same state as the terminals 2 and 6 (input of counter and decoder 4). The other items of FIG. 3 have been described in the foregoing.

The operation of all the facilities hereinbefore described will now be explained in the following paragraphs which correspond to the consecutive operations hereinafter mentioned;

A. Bringing into operation, start of a sequence of measurements.

B. Performance of a first measurement (master device and auxiliary device, paragraphs Ba and Bb).

C. End of first measurement and start of next measurement (paragraphs Ca, Cb, Cc).

D. End of a 10-measurement cycle and start of the next cycle (paragraphs Da and Db).

E. End of the 12th cycle and of the measurement sequence, cessation of operation (paragraphs Ea and Eb).

A. — All equipment is energized at both stations P and S; the counter 62 at the master station P is in the zero state and a signal appears at output 2 and output 3; the counter and decoder 4 is in the zero state and a signal appears at its output 7; the and-gate 73 is conductive. If switch 75 is closed, or-gate 74 outputs a signal and the negator 70 blocks the 50 Hz pulses from the source 8. Switch 75 is brought to its open position manually to initiate a measurement sequence; the negator 70 then outputs 50 Hz signals provided that neither of the and-gates 71 or 72 is outputting a signal, a condition which applies all the time that neither of the circuits 10, 11 detects signal-service signals being transmitted over circuit D or over the telecommunication circuit being supervised — i.e., the circuit V1, see Table I. When this time has accumulated to 1 second, 50 pulses have been recorded by the frequency divider 60 and the same delivers at its output 61 a signal which steps the counter 62 on to its 1 state.

If a signal-service signal is being transmitted, the start of a measurement sequence is delayed; it is found by experience that this delay, which varies unpredictably, can be a few seconds and not more than several tens of seconds.

Ba. — Upon the changeover of counter 62 to the 1 state the signals at the outputs 2 and 3 cease and a signal appears at the output *a* of matrix 63; set selector 9 is brought to the 1 state, the set P1 being connected to the measurement circuit, in the "-transmission measurement" state; also, the device 4 steps on one unit and the line selector 23 changes over from the neutral state to the 1 state. The following switchings occur:

The circuit V1 is brought to the measurement state;

The circuit D is brought into operation to bypass the switched-out circuit V1, and the circuit V2 is brought into the supervision state.

The signals at outputs 7, 3 cease; the and-gates 71, 72 can no longer gate signals from 18 or 19 and the pulses from the source 8 can no longer be blocked by the negator 70. From this time on there is no need to keep the switch 75 in its open position, for a measurement sequence has started and it now proceeds automatically.

Bb. — The channel T is re-energized via the changeover device 64 and terminal 46 of FIG. 3 changes its state; the device 44 steps on one unit and the selector 43 changes over from the neutral state to the 1 state; the circuits V1, V2 and the circuit D are switched to the positions mentioned in the previous paragraph — i.e., as at the master station and substantially simultaneously.

Before a signal appears at output 2 as mentioned at the beginning of paragraph A), the counter 82 is in the zero state, a signal is output at terminal 53 and the channel T is energized; the negator 85 blocks the 50 Hz pulses from the source 48; when the signal appears at output 2, the channel T changes over to the zero state and the 50 Hz pulses, instead of being blocked by the negator 85, are applied to input 55 of time base 51. The frequency divider 80 is so devised that the first 50 Hz pulse applied after the normal state leads to a signal at terminal 81; this first pulse changes over counter 82 to the 1 state; the signal at terminal 53 ceases and the 50 Hz pulses can no longer be blocked by the negator 85 even when channel T is re-energized after cessation of the signal at output 2; simultaneously, a signal appears at terminal *a* of matrix 83 so that the set selector changes over from the neutral state to the 1 state in which the measuring set connected at point S1 (FIG. 1) is connected to the measurement circuit in the "reception measurement" state.

As in the case of circuit switching, the switching of the measurement set occurs substantially simultaneously with the switching in the master station; thereafter measurement No. 1 from P to S is made on circuit V1.

Ca. — After the first 1 Hz pulse at 61 (FIG. 2) and for two seconds — i.e., until the 101st 50 Hz pulse — the counter 62 is in the "1" and then in the "2" state, and measurement No. 1 from P to S is made on circuit V1.

At the 101st pulse, the counter 62 changes to the "three" state; the signal at output *a* of matrix 63 ceases and another signal appears at output *b*; set selector 9 changes from the "1" to the "2" state and measuring set P2 is connected to the measurement circuit in the "-transmission measurement" state.

Cb. — Simultaneously, the 101st 50 Hz pulse appearing at terminal 55 makes counter 82 (FIG. 3) change over to the 3 state. The signal at output *a* of matrix 83 ceases, another signal appears at output *b* and measuring set S2 is connected to the measurement circuit in the "reception measurement" state. Measurement No. 2 from P to S is then made on circuit V1.

Cc. — The measurement cycle on this circuit is carried out in the sequence given previously in Table II in accordance with the times decoded by means of time base 1 (frequency divider 60, counter 62, matrix 63); from measurement No. 6 the measurements are made from S to P, measurement sets P1 to P5 being in the "reception measurement" state and sets S1 to S5 being in the "transmission measurement" state.

The total time from the start of the sequence is 26 seconds; clearly, with the equipment described (five-stage counter 62) the total measurement time might be 32 seconds.

Da. — The change of cycle occurs as follows from the "26 seconds" time when the 27th 1 Hz pulse is output at terminal 61 (FIG. 2):

Counter 62 changes seriatim through the 27–31 states and then changes to zero (see Table II) so that the signal of output *j* of matrix 63 ceases while a signal appears at terminal 3 and, since the set selector 9 goes into the neutral state, the measurement sets are disconnected and measurements cease; also, the signal at terminal 3 enables the and-gates 71, 72 to gate any signals output at the outputs 18, 19 of the detector circuits 10, 11; if a signal-service signal is being transmitted on circuit D (which is being used for operation instead of circuit V1), the 50 Hz pulses are blocked by the negator 70 and pulse counting by the time base 1 stops, to resume whenever circuit V2 and channel D are not transmitting signal-service information, so that counter 62 reaches the states 28–31 and zero consecutively at time intervals which may be longer than 1 second, the total possibly being one or more tens of seconds (instead of 6 seconds); this is the "waiting period" of Table II and occurs for the same reason as the start-of-sequence waiting time mentioned in paragraph A).

When counter 62 finally reaches the zero state and circuits V2 and D are not transmitting signal-service information, an end-of-cycle signal appears at output 2 and steps on the device 4 one unit, so that line selector 23 changes over from the 1 state to the 2 state and the following switchings occur:

Circuit V1 is restored to its former normal-traffic state and circuit V2 is brought to the measurement state;

Circuit D is brought in as a traffic bypass to replace channel V2, and

Circuit V3 is placed in the supervision state.

The first 50 Hz pulses gated by the negator 70 produce the same effects as the 50 Hz pulses at the start of the sequence, and a new measurement cycle (on circuit V2) begins, bearing in mind the operations taking place at the auxiliary station as will be described hereinafter in paragraph Db).

Db. — The counter 82 of FIG. 3 reaches the 27 state at the same time as the counter 62 of FIG. 2; a signal then appears at terminal 53 and the set selector 49 changes over to the neutral state and the measurement sets are disconnected. Since channel T is energized, gate 84 is conductive and the negator 85 blocks the 50 Hz pulses from the source 48.

When the end-of-cycle signal appears at output 2 (counter 62 reaching the zero state), channel T changes over to the zero state and negator 85 gates the 50 Hz pulses, while the device 44 steps on one unit and the line selector 43 changes over from the 1 state to the 2 state, thus causing the simultaneous occurrence at the auxiliary station of the same circuit switching as hereinbefore.

The measurement cycle starts on circuit V2 and continues uninterruptedly for 26 seconds; the next change of cycle occurs after another waiting time, as in the case of the changeover from the first cycle to the second cycle.

Similar considerations apply to subsequent cycles until the start of the 12th cycle; the latter comprises the operations which are described in the following paragraphs and which lead to the end of the 12th cycle and to the termination of the measurement sequence.

Ea. — During the 12th cycle, the device 4 outputs a signal at its output C12 (FIGS. 1 and 2 and Table I, "12" stage of selector 23); when counter 62 changes over to the zero state and the end-of-cycle signal at output 2 is applied to input 6 of counter 4 (FIG. 2), the signals at C12 and at output 3, applied to the two inputs of an and-gate (which is not shown but is inside the device 4) lead to such and-gate gating a signal which zero-resets the device 4, returns the circuit selector 23 to the neutral state and causes a signal to appear at output 7 of device 4; the signal at output 3 is then applied to one input of each of and-gates 71–73 and, since switch 75 is in its closed position, the negator 70 blocks the 50 Hz pulses and the master station ceases to operate.

Eb. — At the end of the 12th cycle, the 50 Hz pulses are blocked with effect from the "26 seconds" time as in the earlier cycles; the end-of-cycle signal transmitted over channel T changes over the line selector 43 from the "12" state to the neutral state; also, since the master station has stopped automatic operation, the auxiliary station too ceases operation. With the two stations in this state, all the circuits V1 to V12 are back in their former traffic states and the channel D is on standby.

The system according to the invention is of use for measurements on 4-wire or 2-wire telecommunication circuits.

Also, as the description shows, the only difference between the master and auxiliary stations is the presence or absence of circuits for detecting signal-service information and the structure of the logic circuits 5 and 50; the invention also covers any facility comprising two similar devices, one for each station, each comprising a single system of elements common to the master device and to the auxiliary device as hereinbefore described, and the distinctive items plus any known kind of appropriate switching means for placing the combined facility as required in either the "master" or "auxiliary" state.

What I claim is:

1. Automatic apparatus for successively measuring the transmission characteristics of each one of a group including a number N of telecommunication circuits interconnecting two stations P and S, comprising a master device at said station P and an auxiliary device at station S and using two transmission channels extending between said stations and a still further telecommunication circuit as service channel, remote control channel and bypass circuit respectively; each of said devices including a plurality of signal transmission measurement sets, a measurement set switching selector and a telecommunication circuit switching selector for selectively interconnecting said measurement sets and telecommunication circuits, both said selectors having control means controlled by programmed control circuits operated from a time base itself controlled by a periodic pulse source; said service channel interconnecting said measurement set selectors, said remote control channel interconnecting said control means of said measurement set selectors and said bypass circuit interconnecting said telecommunication circuit selectors; in which apparatus said master device further comprises supervision means for supervising telecommunication circuit occupation; and in which said programmed control circuits are brought into operation by an electric start signal delivered by said time base and comprise means for continuously carrying out upon receipt of such signal a measurement sequence comprising N consecutive measurement cycles for the respective N telecommunication circuits, such a cycle consisting of a number M of measurements in the direction from P to S and a number M of similar measurements in the direction from S to P on a single circuit, each measurement having a predetermined individual duration and each cycle having a fixed duration, the interval between any such cycle and the next cycle being controlled by said supervision means.

2. Apparatus as claimed in claim 1, in which said supervision means include detection means for detecting transmission of service signals over whichever telecommunication circuit is to be measured during said next cycle and over said bypass circuit in which operation preventing means controlled by said supervision means are provided to prevent telecommunication circuit selector operation before the start of a measurement cycle when service signal transmission is detected by said detection means; and in which switching of said telecommunication circuits by said circuit selector causes said bypass circuit to be successively substituted for each one of the N telecommunication circuits for the duration of one measurement cycle, said N circuits being successively connected to each one of said measurement sets during latter said cycle, while whichever telecommunication circuit is to be measured during said next cycle is brought under supervision of said supervision means.

3. Apparatus as claimed in claim 2, in which said programmed control circuits in each of said devices comprise a counter-decoder and a gate-type logic circuit having conditioning inputs; said time base having an input, a first output, a second output and a plurality of other outputs, and said counter-decoder having a stepping-on input, a second input, a first output and a number of other outputs; in which said time base input is fed from said pulse source via said gate circuit whose conditioning inputs are respectively connected to said time base first output, to said counter-decoder first output and to respectively corresponding outputs provided in said detection means; said time base second output is connected to said remote control channel; all other of said time base plurality of outputs are connected to said control means of said measurement set selector; and said time base first output is connected to said second input of said counter-decoder, said time base second output is connected to said stepping-on input of said counter-decoder, and said first output and said outputs of said number of other outputs of said counter-decoder are connected to said control means of said telecommunication-circuit selector.

4. Apparatus as claimed in claim 3, in which said logic circuit includes a first, a second and a third and-gates, an or-gate, a negator and a switch, one input of each and-gate being connected to said first output of said time base, the other inputs of said first and second and-gates being respectively connected to corresponding outputs of said supervision means, the other input of said third and-gate being connected to the first output of said counter-decoder, the outputs of each of said first and second and-gates being connected to an input of said or-gate, the output of said third and-gate being connected to an input of the or-gate via said switch, the output of the or-gate being connected to the inverting input of said negator, the non-inverting input of said negator being connected to said pulse source and the output of said negator being connected to the input of said time base.

5. Apparatus as claimed in claim 1, in which the periodic pulses from said pulse sources in both said master and auxiliary devices have a common repetition period much shorter than the basic period of said time base.

* * * * *